M. LEITCH.
METHOD OF DETINNING TIN SCRAP.
APPLICATION FILED SEPT. 19, 1908.
907,061.
Patented Dec. 15, 1908.
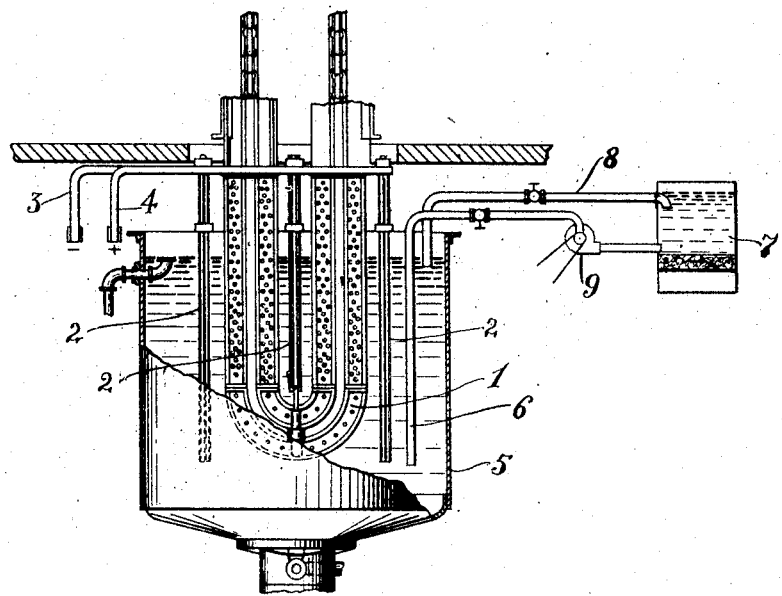
Witnesses:
Inventor
MEREDITH LEITCH.
By his Attorneys.

UNITED STATES PATENT OFFICE.

MEREDITH LEITCH, OF SPRINGFIELD, MASSACHUSETTS, ASSIGNOR TO METAL PROCESS COMPANY, OF NEW YORK, N. Y., A CORPORATION OF NEW YORK.

METHOD OF DETINNING TIN-SCRAP.

No. 907,061.   Specification of Letters Patent.   Patented Dec. 15, 1908.

Original application filed February 28, 1907, Serial No. 359,854. Divided and this application filed September 19, 1908. Serial No. 453,876.

*To all whom it may concern:*

Be it known that I, MEREDITH LEITCH, a citizen of the United States, residing at Springfield, Hampden county, Massachusetts, have invented certain new and useful Improvements in Methods of Detinning Tin-Scrap, of which the following is a full, clear, and exact description.

My invention relates to improvements in the methods of detinning tin scrap by apparatus employing a circulating electrolyte, such for instance as caustic soda, and has for its object to reduce the deterioration of the electrolyte. When caustic soda is used, the carbonic acid gas in the air unites with elements in the caustic soda, causing it to carbonate and consequently deteriorate. I have observed that when the electrolyte is circulated in the ordinary way, waterfalls are produced and air is entrained during the circulation, so that a large amount of air is thus brought into contact with the electrolyte and the carbonating and consequent deterioration takes place rapidly.

In carrying out my invention I prevent the entraining of air preferably at any and all points. I also draw the liquid off and introduce it at the most desirable points and heat it so as to maintain it at the proper degree of temperature.

The following is a description of my invention and of apparatus suitable for carrying it out, reference being had to the accompanying drawings, which show the apparatus in side elevation with parts broken away.

Referring more particularly to the drawings, 1 is a basket containing the tin scrap to be detinned and having a suitable conveyer therein to cause the scrap to pass through the detinning bath.

2 are cathode plates upon which the tin removed from the scrap is deposited.

3 and 4 are circuit terminals connected to the basket and the cathode plates respectively and supplied with electricity from any suitable source.

5 is a tank containing the electrolyte in which the scrap and the cathode plates are immersed.

6 is an outlet pipe leading to a heating tank 7 and so arranged as to draw the electrolyte from near the bottom of the tank 5 and discharge it in proximity to the bottom of the heating tank 7.

8 is a return pipe leading from beneath the surface of the electrolyte and the heating tank 7 and discharged beneath the surface of the electrolyte and within the detinning tank 5. The electrolyte which I prefer to use is caustic soda. The electrolyte is caused to circulate by a pump 9 situated in the pipe leading from the bottom of the detinning tank to the bottom of the heating tank. By the arrangement thus described, the electrolyte is circulated from the detinning tank to the heating tank and back without the presence of any waterfall, and thereby the entrainment of all air is prevented and the only portions of the electrolyte which are exposed to the air so as to be affected by it being the surfaces of the two tanks. The electrolyte by the heating tank 7 is kept at the desired temperature.

By reason of my improvement the frequency of regenerating the electrolyte is very much reduced since its deterioration is very largely prevented, it being necessary to draw off only a portion of the electrolyte from time to time in order to prevent it from becoming fatigued by reason of the carbonating that necessarily takes place.

When the pump is in operation, the effect is to draw the electrolyte from the detinning bath near the bottom where it is coolest, and force it into the heating boiler to a height above the level in the bath so that it flows out into the bath by its own head. It leaves the heating boiler without entraining air as the mouth of the return pipe is below the surface therein, and delivers the liquid into the bath below the surface so as not to drive in any air at that point. The electrolyte with this arrangement becomes carbonated much more slowly than is the case in systems where the circulation takes place with one or more waterfalls, and materially reduces the labor and expense otherwise necessary to keep it in proper condition.

This application is a division of my pending application Serial No. 359,854, filed February 28, 1907.

What I claim is—

1. In the method of operating detinning apparatus employing a circulating electrolyte, like caustic soda, the improvement which consists in drawing the electrolyte out of the detinning bath from beneath the surface of the electrolyte therein and returning it to said bath at a point below said surface and subjecting portions so withdrawn to heat.

2. In the method of operating detinning apparatus employing a circulating electrolyte, like caustic soda, the improvement which consists in causing the electrolyte to pass through a series of tanks, one of which is the detinning bath and another of which is a heating bath, heating the said electrolyte in said heating bath and causing it to both enter and leave each of said tanks at points below the level of the electrolyte therein.

3. In the method of operating detinning apparatus employing a circulating electrolyte, like caustic soda, the improvement which consists in causing the electrolyte to pass through a series of tanks, one of which is the detinning bath and another of which is a heating bath, heating the said electrolyte in said heating bath and causing it to both enter and leave each of said tanks at points below the level of the electrolyte therein, causing said electrolyte to enter the detinning bath below but in proximity to the surface of the liquid therein and to leave said bath at a point in proximity to its bottom and to enter said heating bath at a point in proximity to its bottom and leave the same at a point below but in proximity to the surface of the liquid therein.

MEREDITH LEITCH.

Witnesses:
FREDERICK K. FEARNSIDE,
JOHN J. DONELAN.